United States Patent
Yoshida (10) Patent No.: US 11,327,980 B2
(45) Date of Patent: May 10, 2022

(54) CACHED UPDATABLE TOP-K INDEX

(71) Applicant: INTERNATIONAL BUSINESS MACHINES CORPORATION, Armonk, NY (US)

(72) Inventor: Issei Yoshida, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 16/854,709

(22) Filed: Apr. 21, 2020

(65) Prior Publication Data

US 2021/0326347 A1    Oct. 21, 2021

(51) Int. Cl.
*G06F 16/2457* (2019.01)
*G06F 16/22* (2019.01)
(Continued)

(52) U.S. Cl.
CPC .... *G06F 16/24578* (2019.01); *G06F 16/2228* (2019.01); *G06F 16/2379* (2019.01);
(Continued)

(58) Field of Classification Search
CPC .......... G06F 16/24578; G06F 16/2228; G06F 16/2379; G06F 16/24552; G06F 16/248; G06F 16/93
See application file for complete search history.

(56) References Cited

U.S. PATENT DOCUMENTS 5,442,778 A * 8/1995 Pedersen ............ G06F 16/93
707/999.005
6,324,637 B1  11/2001 Hamilton
(Continued)

FOREIGN PATENT DOCUMENTS

CN  102402605 A  4/2012
CN  102693308 A  9/2012
(Continued)

OTHER PUBLICATIONS

Nasukawa, T. et al., "Text Analysis and Knowledge Mining System" IBM Systems Journal (Oct. 2001) pp. 967-984, vol. 40, No. 4.
(Continued)

*Primary Examiner* — Hares Jami
*Assistant Examiner* — Vy H Ho
(74) *Attorney, Agent, or Firm* — Tutunjian & Bitettto, P.C.; Randall Bluestone (57) ABSTRACT

A method is provided that stores, in a second memory, an index structure including, for each given word from among words included in documents, a group of document IDs of documents including the given word. The method stores an index structure subset in a main memory which is faster than secondary memory. The method acquires a keyword and identifies any documents including the keyword. The method finds top-K frequent words among the words included in the identified documents by: identifying, for each given group in descending order of the number of the documents IDs therein, the number of documents IDs of the identified documents in the given group, from the subset when the number of document IDs in the given group is within the range, and from the index structure otherwise; and presenting words of top-K groups with a largest amount of the document IDs identified.

19 Claims, 7 Drawing Sheets

(51) Int. Cl.
*G06F 16/23* (2019.01)
*G06F 16/2455* (2019.01)
*G06F 16/248* (2019.01)
*G06F 16/93* (2019.01)
*G06F 16/338* (2019.01)

(52) U.S. Cl.
CPC ...... *G06F 16/248* (2019.01); *G06F 16/24552* (2019.01); *G06F 16/93* (2019.01)

(56) References Cited

U.S. PATENT DOCUMENTS

| | | | |
|---|---|---|---|
| 7,584,184 | B2 | 9/2009 | Takuma et al. |
| 8,892,549 | B1* | 11/2014 | Thakur ................. G06F 16/338 707/748 |
| 9,116,938 | B2 | 8/2015 | Swaminathan et al. |
| 9,552,412 | B1* | 1/2017 | Lowe ................. G06F 16/3325 |
| 10,013,440 | B1 | 7/2018 | Gupta et al. |
| 10,437,892 | B2 | 10/2019 | Risvik et al. |
| 10,452,691 | B2 | 10/2019 | Liu |
| 2010/0010989 | A1* | 1/2010 | Li ......................... G06F 16/334 707/E17.017 |
| 2015/0227624 | A1* | 8/2015 | Busch ............... G06F 16/24578 707/728 |
| 2016/0179981 | A1* | 6/2016 | Enoki ................... G06F 16/319 707/800 |
| 2019/0266267 | A1 | 8/2019 | Ma et al. |
| 2019/0347360 | A1 | 11/2019 | Bortnikov et al. |

FOREIGN PATENT DOCUMENTS

| | | |
|---|---|---|
| CN | 104679778 A | 6/2015 |
| CN | 105653646 A | 6/2016 |
| CN | 106407447 A | 2/2017 |
| CN | 108256086 A | 7/2018 |
| CN | 109614817 A | 4/2019 |
| WO | 2008061290 A1 | 5/2008 |

OTHER PUBLICATIONS

Lucid Imagination "Apache Lucene—Index File Formats" The Apache Software Foundation (Jun. 2013) pp. 1-15.
Mell et al. "The NIST Definition of Cloud Computing", NIST Special Publication 800-145, 2011, 7 pages.
Piatov, Danila, et al. "Interactive and Space-Efficient Multi-Dimensional Time Series Subsequence Matching", Information Systems, Databases: Creation, Management and Utilization, vol. 82. May 28, 2019, pp. 1-36.
International Search Report issued in PCT Application No. PCT/CN2021/083010, dated Jun. 25, 2021, pp. 1-9.

* cited by examiner

CACHED UPDATABLE TOP-K INDEX

BACKGROUND

The present invention generally relates to data storage, and more particularly to a cached updatable top-k index.

In the field of text analysis, finding the top-k frequent words (simply top-k) in a collection of documents which is often dynamically given by, for example, a document search, has been proven essential in finding new insights from data.

There exist several techniques to compute efficiently the top-k frequent words given a search query. However, in these techniques, the index structure is hard to update and not suitable for use cases where new documents frequently come in. Moreover, in these techniques, the index may be suitable for update but suffers from the query runtime because it requires a large number of random access to secondary storage devices (e.g., a Hard Disk Drives (HDDs)).

SUMMARY

According to aspects of the present invention, a computer-implemented method is provided for storing data. The method includes storing an index structure in a secondary memory. The index structure includes, for each given word from among words comprised in documents, a group of document IDs of the documents which comprise the given word. Groups in the index structure are listed in descending order of a number of documents IDs therein. The method further includes storing a subset of the index structure in a main memory having a faster access time than the secondary memory. The number of documents IDs in each of groups in the subset are within a range between $N_a$ and $N_b$, where $N_a > N_b$. The method also includes acquiring a keyword from a query. The method further includes identifying any of the documents which include the keyword. The method additionally includes finding top-K frequent words among the words included in the identified documents by: identifying, for each given group from among the groups in descending order of the number of the documents IDs in the given group, the number of documents IDs of the identified documents in the given group, from the subset in the main memory when the number of document IDs in the given group is within the range, and from the index structure in the secondary memory when the number of document IDs in the given group is not within the range; and presenting words of top-K groups with a largest amount of the document IDs identified.

According to other aspects of the present invention, a computer program product is provided for storing data. The computer program product includes a non-transitory computer readable storage medium having program instructions embodied therewith. The program instructions are executable by a computer to cause the computer to perform a method. The method includes storing an index structure in a secondary memory. The index structure includes, for each given word from among words comprised in documents, a group of document IDs of the documents which comprise the given word. Groups in the index structure are listed in descending order of a number of documents IDs therein. The method further includes storing a subset of the index structure in a main memory having a faster access time than the secondary memory. The number of documents IDs in each of groups in the subset are within a range between $N_a$ and $N_b$, where $N_a > N_b$. The method also includes acquiring a keyword from a query. The method further includes identifying any of the documents which include the keyword. The method additionally includes finding top-K frequent words among the words comprised in the identified documents by: identifying, for each given group from among the groups in descending order of the number of the documents IDs in the given group, the number of documents IDs of the identified documents in the given group, from the subset in the main memory when the number of document IDs in the given group is within the range, and from the index structure in the secondary memory when the number of document IDs in the given group is not within the range; and presenting words of top-K groups with a largest amount of the document IDs identified.

According to yet other aspects of the present invention, a computer processing system is provided for determining command-to-process correspondence. The computer processing system includes a memory device including program code stored thereon. The computer processing system further includes a hardware processor, operatively coupled to the memory device, and configured to run the program code stored on the memory device to store a subset of the index structure in a main memory having a faster access time than the secondary memory. The number of documents IDs in each of groups in the subset are within a range between $N_a$ and $N_b$, where $N_a > N_b$. The hardware processor is further configured to runt the program code to acquire a keyword from a query. The hardware processor is also configured to run the program code to identify any of the documents which include the keyword. The hardware processor is additionally configured to find top-K frequent words among the words comprised in the identified documents by: identifying, for each given group from among the groups in descending order of the number of the documents IDs in the given group, the number of documents IDs of the identified documents in the given group, from the subset in the main memory when the number of document IDs in the given group is within the range, and from the index structure in the secondary memory when the number of document IDs in the given group is not within the range; and presenting words of top-K groups with a largest amount of the document IDs identified.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a cached updatable top-k index.

One or more embodiments of the present invention use a memory cache that enables both efficient update and runtime with a restricted amount of main memory.

One or more embodiments of the present invention cache infrequent words in main memory (e.g., Random Access Memory (RAM)) to minimize random accesses to secondary devices (e.g., Hard-Disk Drives (HDDs)), which is opposite to a standard usage of a cache which stores the most frequent objects that are most likely to be accessed. Here, the main memory is essentially being operates as a cache for the hard-disk drive, storing a subset of an index. The stored subset in the main memory includes words of moderate frequency of occurrence, while the secondary device stores the remaining portion of the index including words having the highest (and optionally the lowest frequencies of occurrence.

Figure 1:
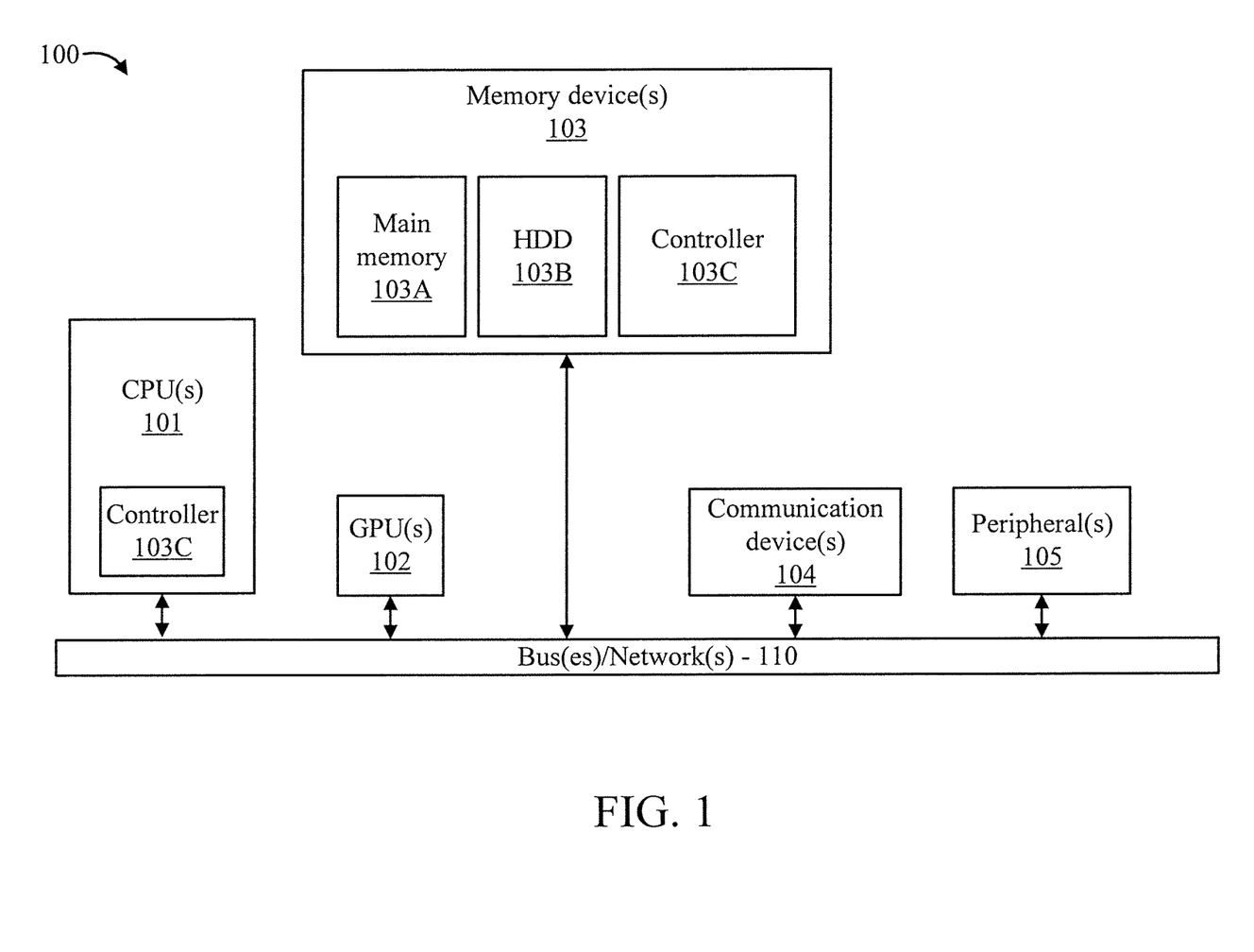
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, memory devices 103 include a main memory 103A and a Hard-Disk Drive (HDD) 103B coupled to a memory controller 103C. The memory controller 103C is configured control storage of data to the main memory 103A and the HDD 103B. In an embodiment, the memory controller 103C can be implemented in hardware at least in part by a CPU 101 or GPU 102.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
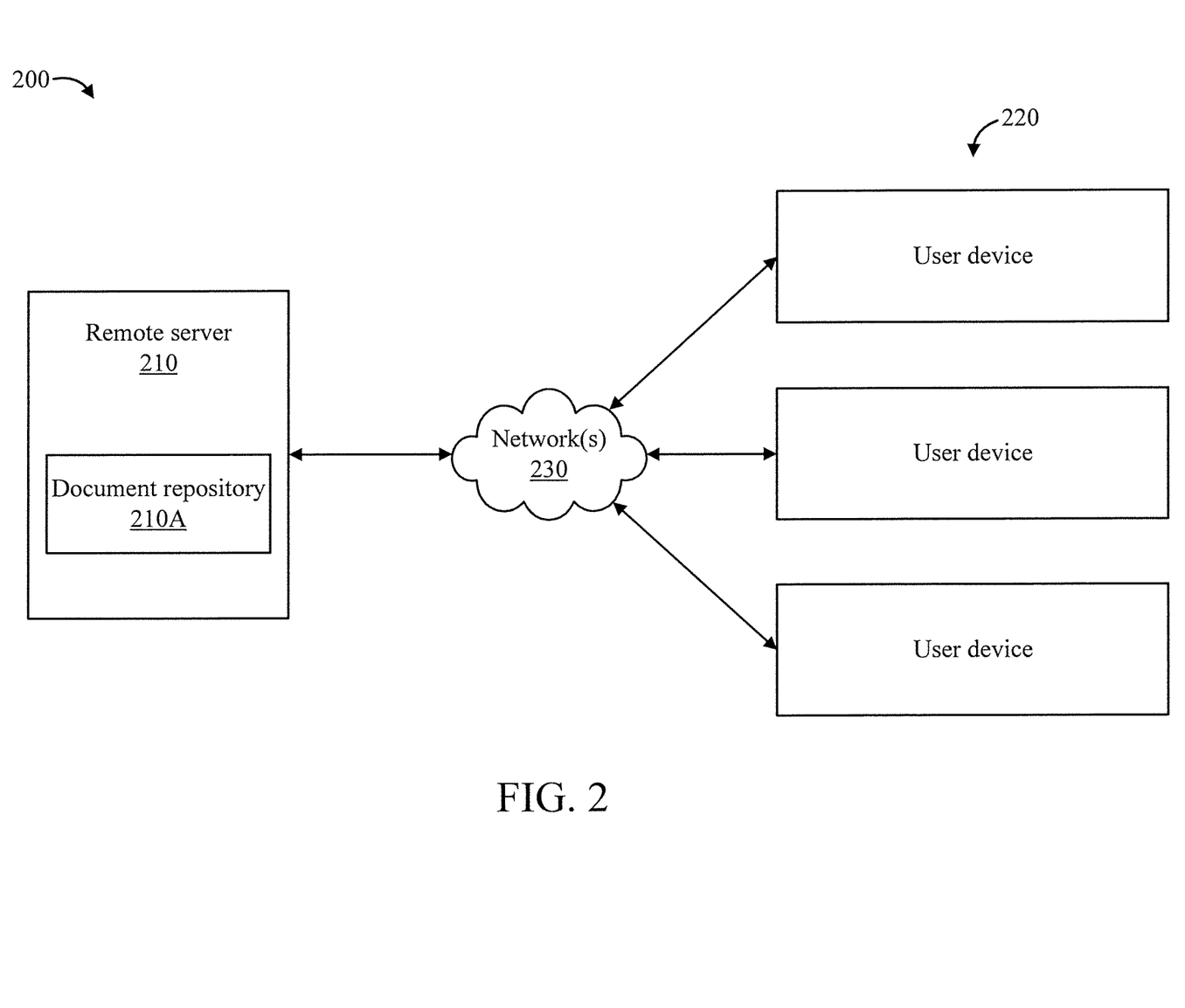
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a remote server 210 and a set of user devices 220. The set of user devices 220 can access the remote server 210 over one or more networks 230. Each of the set of user devices 220 can be configured similar to computer processing system 100 of FIG. 1 or can be implemented by a different device (e.g., a mobile phone, a tablet, etc.).

The remote server 210 includes a document repository 210A from which documents are searched for and retrieved by the user devices 220 for local storage. The local storage is implemented in an efficient way by the user devices 220 in order to minimize accesses to secondary memory (caches). In an embodiment, the remove server 210 can be implemented using a cloud configuration (see, e.g., FIGS. 6-7). For example, the documents can be provided as a cloud service for document search or document retrieval. In another embodiment, the remote server 220 can be configured as infrastructure as a service, where the storing using the present invention is performed on the server and is accessed by software on the user devices 220. For example, the user device may include a document search engine that retrieves documents based on entered keywords, where the documents and/or top-k words are provided to a user based on the entered keywords.

Figure 3:
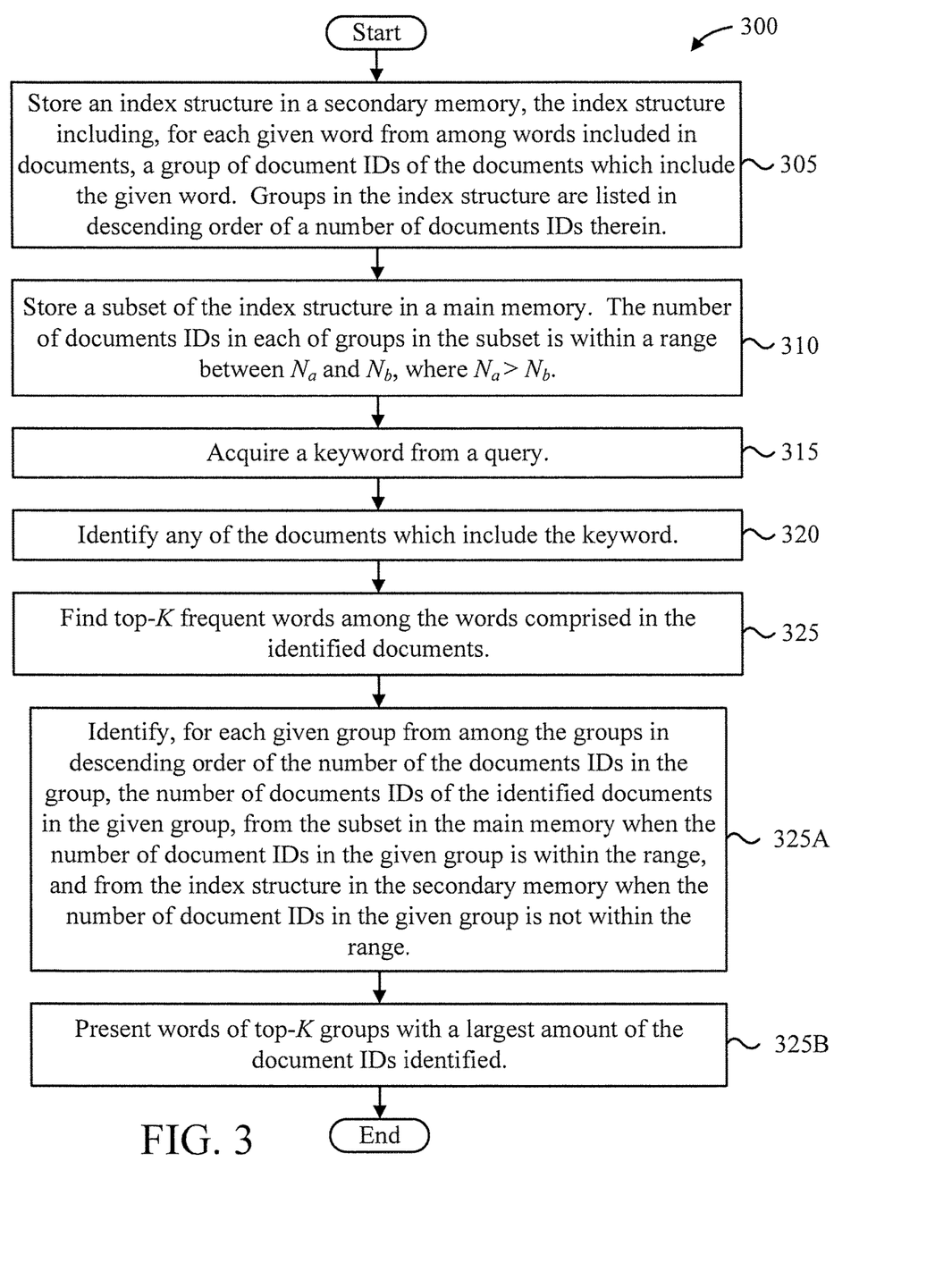
FIG. 3 is a flow diagram showing an exemplary method for data storage, in accordance with an embodiment of the present invention.

FIG. 3 is a flow diagram showing another exemplary method 300 for data storage, in accordance with an embodiment of the present invention.

At block 305, store an index structure in a secondary memory, the index structure including, for each given word from among words included in documents, a group of document IDs of the documents which include the given word. Groups in the index structure are listed in descending order of a number of documents IDs therein.

At block 310, store a subset of the index structure in a main memory having a faster access time than the secondary memory. The number of documents IDs in each of groups in the subset is within a range between $N_a$ and $N_b$, where $N_a > N_b$.

At block 315, acquire a keyword from a query.

At block 320, identify any of the documents which include the keyword.

At block 325, find top-K frequent words among the words comprised in the identified documents.

In an embodiment, block 325 can include blocks 325A and 325B.

At block 325A, identify, for each given group from among the groups in descending order of the number of the documents IDs in the group, the number of documents IDs of the identified documents in the given group, from the subset in the main memory when the number of document IDs in the given group is within the range, and from the index structure in the secondary memory when the number of document IDs in the given group is not within the range.

At block 325B, present words of top-K groups with a largest amount of the document IDs identified.

Figure 4:
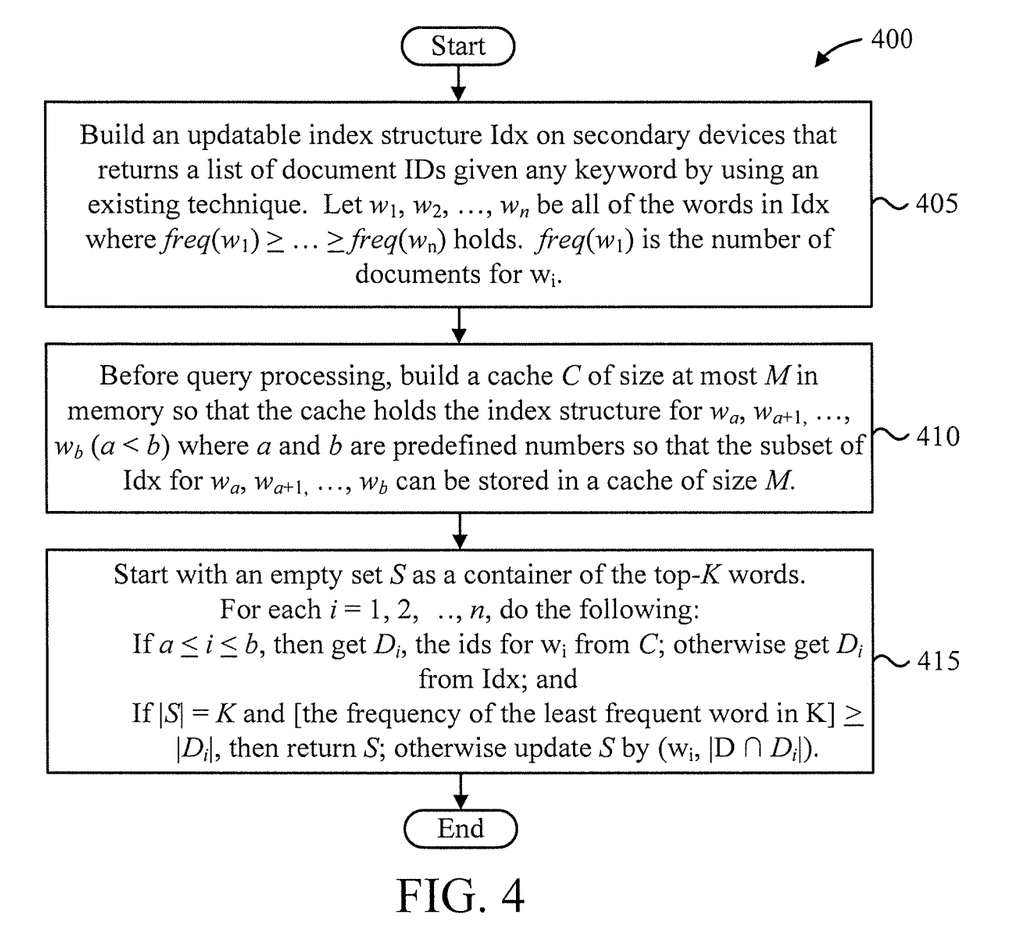
FIG. 4 is a flow diagram showing another exemplary method for data storage, in accordance with an embodiment of the present invention.

FIG. 4 is a flow diagram showing yet another exemplary method 400 for data storage, in accordance with an embodiment of the present invention.

Method 400 operates on the following assumption: The maximum value of the size of the cache is given, say M (10 megabytes, for example).

Method 400 involves an index building portion 491 and a query processing portion 492. The input of the index building portion 491 is a collection of documents. The output of the index building portion 491 is an index on secondary devices. The input of the query processing portion 492 is D, a list of document IDs as a query. The output of the query processing portion 492 is the top-K words with their frequencies.

At block 405, build an updatable index structure Idx on secondary devices that returns a list of document IDs given any keyword by using an existing technique. Let $w_1$, $w_2$, ..., $w_n$ be all of the words in Idx where $freq(w_1) \geq ... \geq freq(w_n)$ holds. $freq(w_1)$ is the number of documents for $w_i$.

At block 410, before query processing, build a cache C of size at most M in memory so that the cache holds the index structure for $w_a, w_{a+1}, ..., w_b$ (a<b) where a and b are predefined numbers so that the subset of Idx for $w_a, w_{a+1}, ..., w_b$ can be stored in a cache of size M where M is defined as the maximum number of document IDs. For example, this condition is satisfied if b=n and take a so that $M \geq freq(w_a) + freq(w_{a+1}) + ... + freq(w_b)$.

At block 415, start with an empty set S as a container of the top-K words. For each i=1, 2, ..., n, do the following:

If $a \leq i \leq b$, then get $D_i$, the ids for $w_i$ from C; otherwise get $D_i$ from Idx; and If $|S|=K$ and [the frequency of the least frequent word in K]$\geq |D_i|$, then return S;

otherwise update S by $(w_i, |D \cap D_i|)$. The value of i at this step is called early-out and it can also be used as an estimation of the value of b after a query processing is completed. The estimation can be used for queries in the future. Another usage of early-out is to collect early-outs as the result of processing of multiple queries and to take b as the average of them.

A description will now be given regarding a variation for obtaining a good range (a, b) for the cache, in accordance with an embodiment of the present invention.

Compute the time of query processing for various (random) queries with different frequencies, and then estimate a value of (a, b) that satisfies the condition of memory usage and the expected upper-bound on the processing-time.

Figure 5:
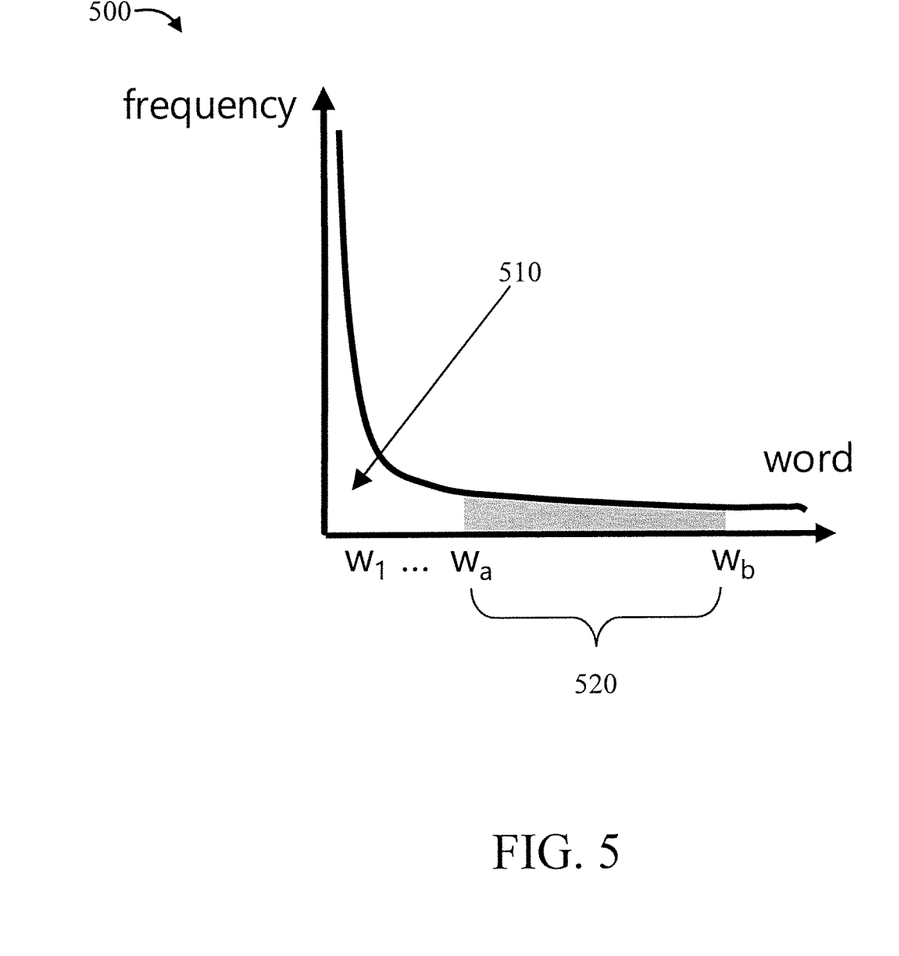
FIG. 5 is a plot of a graph of a cached top-K indexes, in accordance with an embodiment of the present invention.

FIG. 5 is a plot of a graph of a cached top-K indexes 500, in accordance with an embodiment of the present invention.

As can be seen, there is a region 520 that is cached using main memory (e.g., RAM) as part of the invention, where that region 520 includes words of moderate (intermediate) frequency of occurrence. In contrast, a typical cache includes words of greatest access frequency 510.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
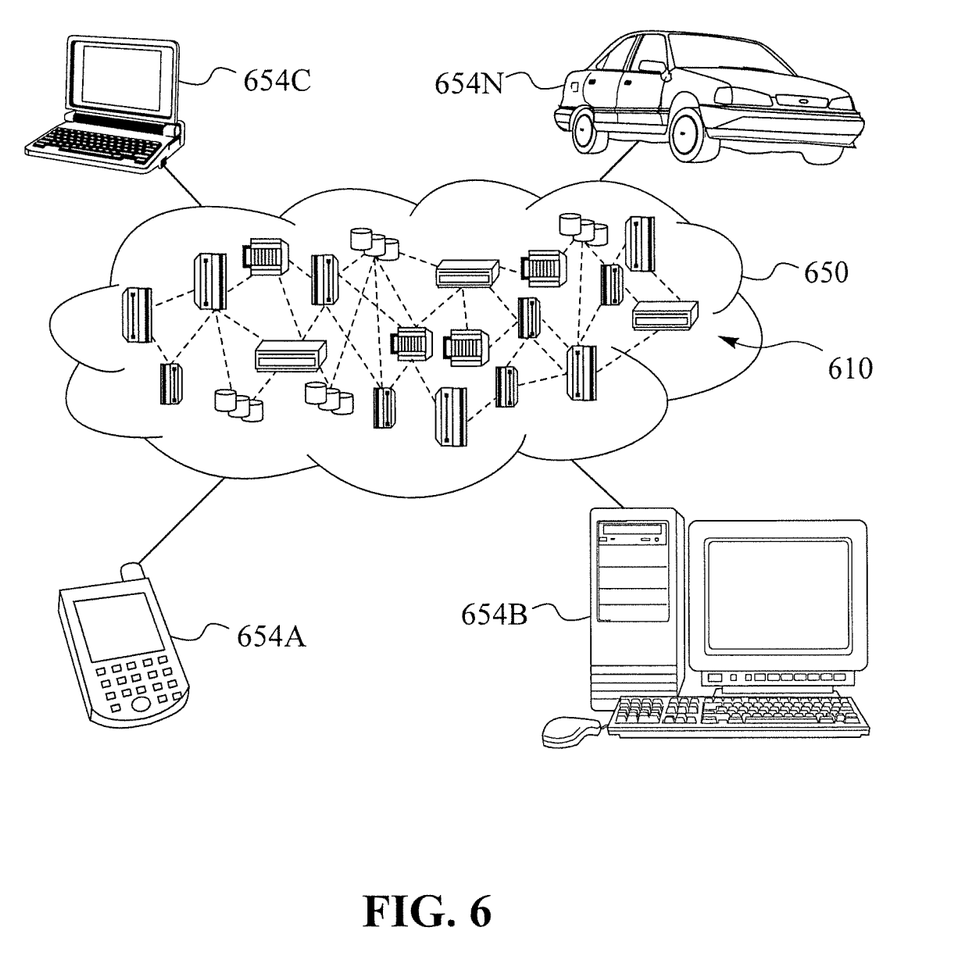
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
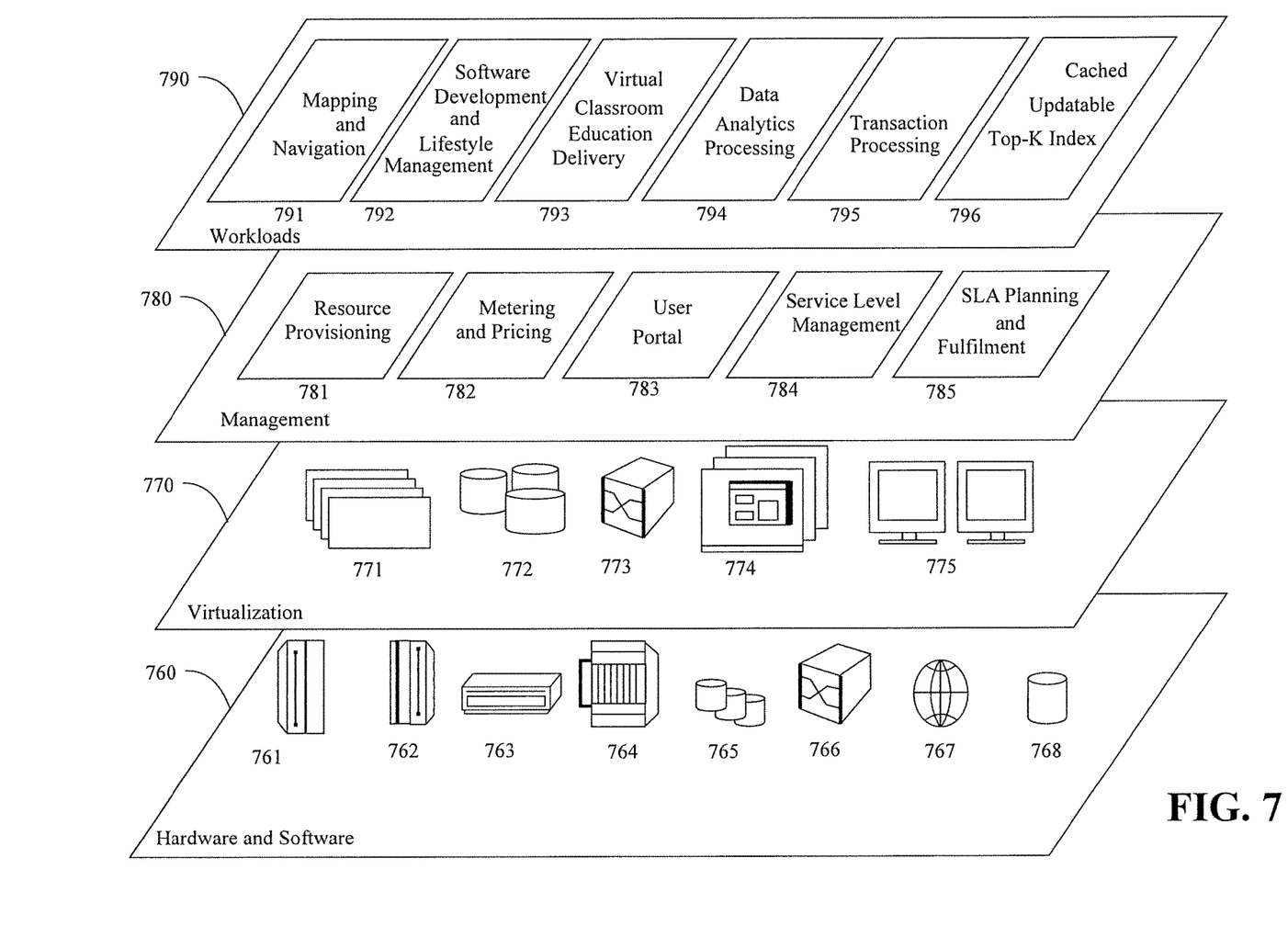
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and cached updatable top-k index 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for storing data, comprising:
    storing an index structure in a secondary memory, the index structure including, for each given word from among words comprised in documents, a group of document IDs of the documents which comprise the given word, wherein groups in the index structure are listed in descending order of a number of documents IDs therein;
    storing a subset of the index structure in a main memory having a faster access time than the secondary memory, the number of documents IDs in each of groups in the subset being within a range between $N_a$ and $N_b$, where $N_a > N_b$;
    acquiring a keyword from a query;
    identifying any of the documents which include the keyword;
    finding top-K frequent words among the words comprised in the identified documents by
        identifying, for each given group from among the groups in descending order of the number of documents IDs in the given group, the number of documents IDs of the identified documents in the given group, from the subset in the main memory when the number of document IDs in the given group is within the range, and from the index structure in the secondary memory when the number of document IDs in the given group is not within the range; and
    presenting words of top-K groups with a largest amount of the document IDs identified.

2. The computer-implemented method of claim 1, wherein the main memory is a Random Access Memory (RAM) and the second memory is a Hard-Disk Drive (HDD).

3. The computer-implemented method of claim 1, wherein the index structure is configured to be updatable.

4. The computer-implemented method of claim 1, further comprising selectively updating the index structure or the subset of the index structure by adding a new group thereto, responsive to a request of adding a new document to the index structure.

5. The computer-implemented method of claim 1, wherein, for each respective one of the groups, $N_b$ is set to a value of a number of the words in a respective one of the documents.

6. The computer-implemented method of claim 1, wherein, for each respective one of the groups, $N_b$ is estimated by an average of early-outs of past queries.

7. The computer-implemented method of claim 1, wherein the groups in the subset exclude a respective one of the groups having a largest value for the number of documents IDs therein.

8. The computer-implemented method of claim 1, further comprising presetting a value for Na to be greater than a number of occurrences of a most occurring one of the words in the documents.

9. The computer-implemented method of claim 1, further comprising estimating values for $N_a$ and $N_b$ that satisfy a condition of memory usage and an expected processing-time upper-bound.

10. A computer program product for storing data, the computer program product comprising a non-transitory computer readable storage medium having program instructions embodied therewith, the program instructions executable by a computer to cause the computer to perform a method comprising:
    storing an index structure in a secondary memory, the index structure including, for each given word from among words comprised in documents, a group of document IDs of the documents which comprise the given word, wherein groups in the index structure are listed in descending order of a number of documents IDs therein;
    storing a subset of the index structure in a main memory having a faster access time than the secondary memory, the number of documents IDs in each of groups in the subset being within a range between $N_a$ and $N_b$, where $N_a > N_b$;
    acquiring a keyword from a query;
    identifying any of the documents which include the keyword;
    finding top-K frequent words among the words comprised in the identified documents by
        identifying, for each given group from among the groups in descending order of the number of documents IDs in the given group, the number of documents IDs of the identified documents in the given group, from the subset in the main memory when the number of document IDs in the given group is within the range, and from the index structure in the secondary memory when the number of document IDs in the given group is not within the range; and
    presenting words of top-K groups with a largest amount of the document IDs identified.

11. The computer program product of claim 10, wherein the main memory is a Random Access Memory (RAM) and the second memory is a Hard-Disk Drive (HDD).

12. The computer program product of claim 10, wherein the index structure is configured to be updatable.

13. The computer program product of claim 10, further comprising selectively updating the index structure or the subset of the index structure by adding a new group thereto, responsive to a request of adding a new document to the index structure.

14. The computer program product of claim 10, wherein, for each respective one of the groups, $N_b$ is set to a value of a number of the words in a respective one of the documents.

15. The computer program product of claim 10, wherein, for each respective one of the groups, $N_b$ is estimated by an average of early-outs of past queries.

16. The computer program product of claim 10, wherein the groups in the subset exclude a respective one of the groups having a largest value for the number of documents IDs therein.

17. The computer program product of claim 10, further comprising presetting a value for Na to be greater than a number of occurrences of a most occurring one of the words in the documents.

18. The computer program product of claim 10, further comprising estimating values for $N_a$ and $N_b$ that satisfy a condition of memory usage and an expected processing-time upper-bound.

19. A computer processing system for determining command-to-process correspondence, comprising:
 a memory device including program code stored thereon;
 a hardware processor, operatively coupled to the memory device, and configured to run the program code stored on the memory device to
 store a subset of the index structure in a main memory having a faster access time than the secondary memory, the number of documents IDs in each of groups in the subset being within a range between $N_a$ and $N_b$, where $N_a > N_b$;
 acquire a keyword from a query;
 identify any of the documents which include the keyword;
 find top-K frequent words among the words comprised in the identified documents by
  identifying, for each given group from among the groups in descending order of the number of documents IDs in the given group, the number of documents IDs of the identified documents in the given group, from the subset in the main memory when the number of document IDs in the given group is within the range, and from the index structure in the secondary memory when the number of document IDs in the given group is not within the range; and
 presenting words of top-K groups with a largest amount of the document IDs identified.

* * * * *